(12) United States Patent
Wu et al.

(10) Patent No.: US 7,957,495 B2
(45) Date of Patent: Jun. 7, 2011

(54) METHOD AND DEVICE FOR SUPPRESSING NARROWBAND INTERFERENCE

(75) Inventors: Jie Wu, Shenzhen (CN); Jinlin Zhang, Shenzhen (CN); Shijie Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 914 days.

(21) Appl. No.: 11/817,553

(22) PCT Filed: Feb. 24, 2006

(86) PCT No.: PCT/CN2006/000269
§ 371 (c)(1),
(2), (4) Date: Oct. 4, 2007

(87) PCT Pub. No.: WO2006/092093
PCT Pub. Date: Sep. 8, 2006

(65) Prior Publication Data
US 2009/0010366 A1    Jan. 8, 2009

(30) Foreign Application Priority Data
Mar. 1, 2005 (CN) .......................... 2005 1 0008783

(51) Int. Cl.
H03D 1/04 (2006.01)
H03D 1/06 (2006.01)
H03K 5/01 (2006.01)
H03K 6/04 (2006.01)
H04B 1/10 (2006.01)
H04L 1/00 (2006.01)
H04L 25/08 (2006.01)

(52) U.S. Cl. ...................................... 375/346

(58) Field of Classification Search .................. 375/346, 375/144, 130, 148, 149, 260, 321, 345, 350, 375/355; 370/203, 208, 252, 254, 286, 289, 370/328, 335, 342
See application file for complete search history.

(56) References Cited

U.S. PATENT DOCUMENTS

| | | | | |
|---|---|---|---|---|
| 4,613,978 A | * | 9/1986 | Kurth et al. | 375/346 |
| 5,671,247 A | * | 9/1997 | Souissi et al. | 375/144 |
| 6,975,673 B1 | * | 12/2005 | Rouquette | 375/149 |
| 2001/0028692 A1 | * | 10/2001 | Wiese et al. | 375/346 |
| 2002/0071508 A1 | * | 6/2002 | Takada et al. | 375/346 |
| 2010/0150286 A1 | * | 6/2010 | Casabona et al. | 375/346 |

FOREIGN PATENT DOCUMENTS

| | | |
|---|---|---|
| CN | 1293840 A | 5/2001 |
| CN | 1447544 A | 8/2003 |
| CN | 1442969 A | 9/2003 |

OTHER PUBLICATIONS

1st Office Action in corresponding Chinese Application No. 2005100087839 (Jul. 27, 2007). Written Opinion of the International Searching Authority in corresponding PCT Application No. PCT/CN/2006/000269 (May 18, 2006).

* cited by examiner

*Primary Examiner* — David C. Payne
*Assistant Examiner* — Syed Haider
(74) *Attorney, Agent, or Firm* — Leydig, Voit & Mayer, Ltd.

(57) ABSTRACT

The method obtains an interference detection result by detecting sampled digital signals in real time in a transform domain, then maps the interference detection result into an interference suppression pulse function on the basis of a unit noise pulse function, and carries out interference suppression filtering in the transform domain according to the interference suppression pulse function. The present invention is capable of detecting narrowband interference such as monotone, frequency modulation, and phase modulation interferences in a receive channel adaptively in real-time, and suppressing the interference adaptively according to the quantity, energy and bandwidth of the interference, so as to reduce the influence of the interference. Therefore, the present invention may enhance robustness of the communication system against interference. Moreover, the present invention does not need multiple notch devices, costs low and may be implemented simply and reliably.

18 Claims, 3 Drawing Sheets

METHOD AND DEVICE FOR SUPPRESSING NARROWBAND INTERFERENCE

FIELD OF THE INVENTION

The present invention relates to wireless communication field and more particularly to a method and a device for suppressing narrowband interference.

BACKGROUND OF THE INVENTION

In a spread spectrum communication system, when narrowband interference falls into a receive pass-band due to factors such as co-channel or inter-modulation, the unprocessed interference will deteriorate the normal demodulation performance of all subscribers in the cell and reduce capacity and coverage of the cell. Narrowband interference with high energy may even result in congestion in the cell. Moreover, the capacity and coverage of the neighboring co-channel cells will also be affected. Therefore, how to reduce the influence of narrowband interference on the limited frequency spectrum resource is a major concern.

In a wideband communication system, such as a Code Division Multiple Access (CDMA), Wideband Code Division Multiple Access (WCDMA) or Time Division-Synchronous Code Division Multiple Access (TD-SCDMA) system, the influence of interference on the system may be reduced greatly and the overall communication quality and coverage reliability may be maintained by enhancing suppression of narrowband interference falling into the receive pass-band due to factors such as co-channel or inter-modulation.

Usually, the characteristics of narrowband interference are difficult to be foreseen and may vary with time. Accordingly, the influence of interference on the system may be reduced as far as possible only if the interference is detected and suppressed in real time.

Therefore, in some frequency bands that are not completely cleaned (e.g., that are unlicensed or shared) as well as in the initial stage after a base station is brought into use and during the maintenance of the base station, it is of great significance that the system provides adaptive detection and suppression of in-band narrowband interference.

One of the prior arts related to the present invention is the patent application No. 00803299 filed by C. E. Jagger, which disclosed a notch filtering method and device inserted in a Radio Frequency (RF) signal path. Detection of interference is carried out by scanning a pre-segmented analog signal frequency band and a group of notch filters (the notch part includes a two-stage frequency mixer, a local oscillator, a band-pass filter and an intermediate frequency notch filter.) are provided to work serially according to the number of the detected interference, so as to achieve the suppression of narrowband interference.

Though the above prior art can achieve interference suppression in the analog signal frequency band at the front end of the receiver and thereby prevent congestion resulted from extremely high interference, the method and device in the prior art require additional devices in the radio-frequency circuit, including a number of notch devices. Because the implementation procedure is complex and costs highly, it is not competitive in the market.

SUMMARY OF THE INVENTION

In view of the problems in the prior art as described above, the present invention is to provide a method and a device for suppressing narrowband interference. The cost of the present invention is low and the implementation procedure is simple and reliable.

The present invention is implemented with the following technical solutions.

The present invention provides a method for suppressing narrowband interference, including:
  obtaining an interference detection result with sampled digital signals;
  carrying out interference suppression in a transform domain according to the interference detection result.

Preferably, the obtaining an interference detection result with sampled digital signals includes:
  weighting the sampled digital signals;
  processing the weighted digital signals in the transform domain with a transform-domain operator, to obtain the interference detection result.

Preferably, the carrying out interference suppression in a transform domain according to the interference detection result includes:
  mapping the interference detection result into an interference suppression pulse function;
  processing the digital signals with the transform-domain operator;
  performing interference suppression on the interfered digital signals processed with the transform-domain operator by using an interference suppression pulse function.

Preferably, the mapping the interference detection result into an interference suppression pulse function includes: synthesizing the interference suppression pulse function in real time according to the interference detection result on the basis of a unit noise pulse function.

Preferably, the performing interference suppression on the interfered digital signals processed with the transform-domain operator includes:
  performing an "AND" operation on the interference suppression pulse function and the interfered digital signals processed with the transform-domain operator, to calculate and obtain the interference-suppressed digital signals.

Preferably, the method further includes:
performing a transform-domain inverse transformation on the interference-suppressed digital signals to obtain time-domain signals.

Preferably, the method further includes:
performing smooth filtering on the interference detection result processed with the transform-domain operator, to obtain a stable interference detection result.

Preferably, the method further includes:
dividing the sampled digital signals into several data segments;
performing overlap-save or overlap-add on adjacent data segments.

Preferably, the method further includes:
performing data consolidation on the time-domain signals to obtain a consolidated interference suppression result.

Preferably, the method further includes:
comparing the filtered interference detection result with a threshold function, and if the filtered interference detection result exceeds spectrum line parameters of the threshold function, measuring a position characteristic and an energy characteristic of the interference detection result;
reporting the characteristics to a central processing unit of a receiver.

Preferably, the mapping the interference detection result into an interference suppression pulse function further includes:
   choosing the unit noise pulse function according to characteristics of pulses;
   synthesizing the interference suppression pulse function in real time with the interference detection result on the basis of the unit noise pulse function.

The present invention also provides a device for suppressing narrowband interference, including:
   an interference detection unit, configured to obtain an interference detection result according to sampled digital signals;
   an interference suppression unit, configured to carry out interference suppression in a transform domain according to the interference detection result.

Preferably, the interference detection unit includes:
   a preprocessing sub-unit, configured to weight the sampled digital signals;
   a detection transform-domain processing sub-unit, configured to process the weighted digital signals with a transform-domain operator to obtain the interference detection result;
and the interference suppression unit includes:
   an interference filter function synthesizing sub-unit, configured to map the interference detection result to an interference suppression pulse function;
   a suppression transform-domain processing sub-unit, configured to process the digital signals with the transform-domain operator to obtain the interfered digital signals processed with the transform-domain operator;
   a suppression sub-unit, configured to perform a processing according to the interference suppression pulse function and the interfered digital signals processed with the transform-domain operator, to calculate and obtain the interference-suppressed digital signals.

Preferably, the interference detection unit further includes a data segmenting sub-unit configured to segment the sampled digital signals and perform overlap-save or overlap-add on the digital signals on adjacent data segments;
   and the interference suppression unit further comprises:
   a transform-domain inverse transform processing sub-unit, configured to perform a transform-domain inverse transformation on the interference-suppressed digital signals, to obtain time-domain signals;
   a data consolidation sub-unit, configured to perform data consolidation on the time-domain signals, to obtain a consolidated interference suppression result.

Preferably, the interference suppression unit further includes a filtering sub-unit configured to perform smooth filtering on the interference detection result processed with the transform-domain operator, to obtain a stable interference detection result.

Preferably, the interference detection unit further includes:
an interference recognizing and characteristic extracting sub-unit, configured to compare the filtered interference detection result with a threshold function and to measure a position characteristic and an energy characteristic of the interference detection result and report the characteristics to a central processing unit of a receiver if the filtered interference detection result exceeds spectrum line parameters of the threshold function.

Preferably, the device is arranged in a digital signal processing part before baseband demodulation of a wideband receiver.

It is seen from the technical solutions provided in the present invention that, the method and device described in the present invention detect narrowband interference such as monotone, frequency modulation and phase modulation interferences in a receive channel adaptively in real-time by performing digital processing on the interference signals. The method and device of the present invention are capable of suppressing the interference adaptively according to the quantity, energy and bandwidth of the interference, so as to reduce the influence of the interference. Therefore, the present invention may enhance robustness of the communication system against interference. Moreover, the present invention does not need multiple notch devices, costs low and may be implemented simply and reliably.

DETAILED DESCRIPTION OF THE EMBODIMENTS

The present invention is applicable to a digital signal processing part in front of baseband demodulation of the wideband receiver. In other words, a separate narrowband interference suppression device is added behind an Analog-Digital Converter (ADC) of the wideband receiver and in front of a baseband demodulation chip, to process interfered digital signals, thereby effectively enhancing robustness of the receiver against co-channel narrowband interference.

The present invention detects the characteristics of interference in a transform domain in real time, maps the interference detection result into an interference suppression pulse function according to a unit noise pulse function and accomplishes interference suppression filtering in the transform domain with the interference suppression pulse function, thereby enhancing interference resistance capability of the system.

Figure 1:
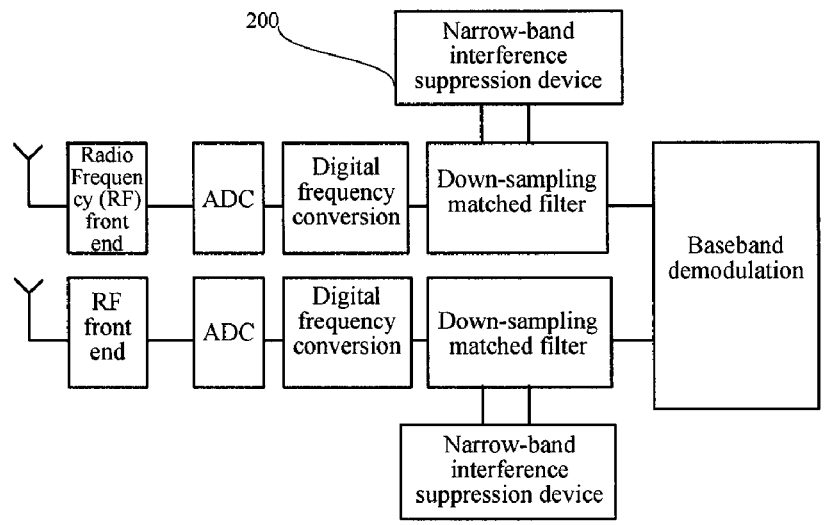
FIG. 1 is a diagram illustrating the position of a device for suppressing narrowband interference provided in the present invention, in a receiver.

In the diversity reception of signals by the receiver, the method and the device for suppressing narrowband interference may be applied in each diversity reception link. FIG. 1 shows the position where the present invention is applied in two diversity reception links: a separate narrowband interference suppression device 200 is added behind an ADC component of a wideband receiver and in front of a baseband demodulation chip. Therefore, in each receiving link, the present invention is implemented after digital frequency conversion and before down-sampling and matched filtering, carries out real-time detection and suppression of in-band narrowband interference in the receive channel and reports interference frequency point and intensity.

Figure 2:
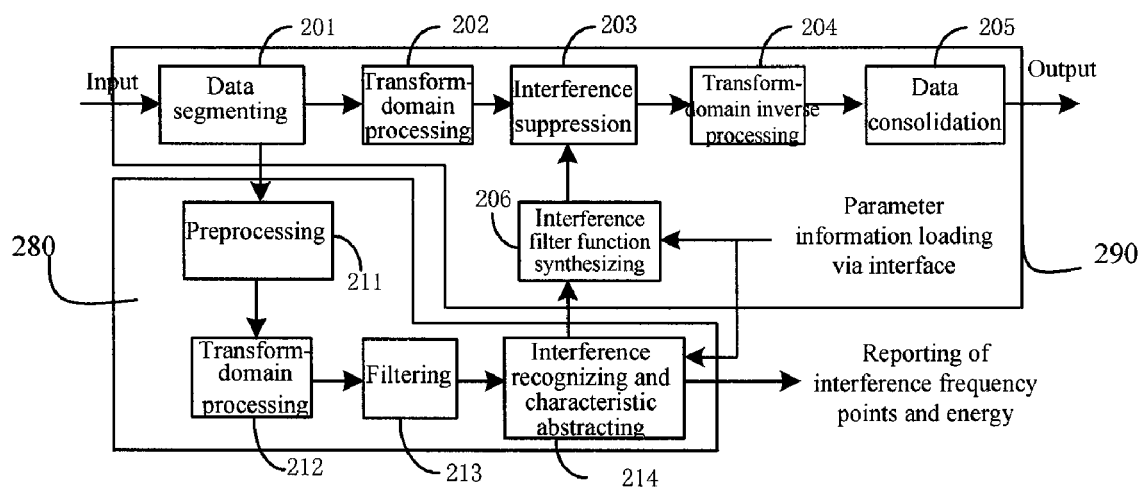
FIG. 2 is a structure diagram illustrating a device for suppressing narrowband interference provided in the present invention.

As shown in FIG. 2, a specific implementation of the device provided in the present invention includes an interference detection unit 280 and an interference suppression unit 290.

The interference detection unit 280 segments and weights the data of a digital signal, then performs a complex Discrete Fourier Transform (DFT) to obtain the modulus of the signal in frequency domain, and then performs filtering on the modulus of the signal in frequency domain, detects whether there is a narrowband interference, obtains the detection result, for example, characteristics information including spectrum line, bandwidth and energy of the interference to be suppressed, to be used for processing by an interference filter function and reports the information to the Central Processing Unit (CPU) of the receiver (not shown).

The interference suppression unit 290 synthesizes in real-time an interference filter function matching the interference according to the interference detection result and performs overlap-save process on the input data, to implement an adaptive suppression filtering on interference in DFT domain at different frequency points and energy levels.

Referring to FIG. 2 again, the interference detection unit 280 includes a preprocessing sub-unit 211, a detection transform-domain processing sub-unit 212 and a filtering sub-unit 213.

The preprocessing sub-unit 211 is configured to weight the data of the sampled digital signal.

The present invention employs a structure in which an interference detection channel and an interference suppression channel are separated. The interference detection structure is designed to be flexible. To improve the interference detection effect, various appropriate weighting methods may be used. For example, the data block x(l,n) in segment l may be weighted with window function w(n), as shown in formula 1:

$$x(l,n)=x(l,n)*w(n), n=0, 1, 2, \ldots, N-1; \quad \text{Formula 1}$$

Figure 3:
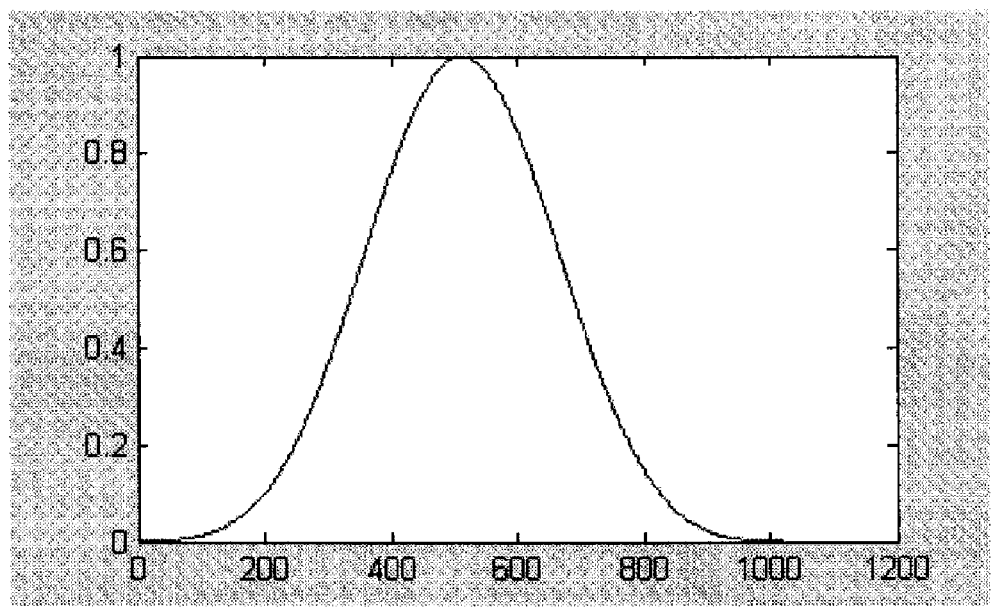
FIG. 3 is a graph illustrating a weighting window function used in preprocessing digital signals in the present invention.

The shape of the window function may be configured from the outside of the device provided in the present invention as required. The mainlobe width, sidelobe suppression capability interference detection and suppression performance of the window function need to be considered comprehensively when the window function is configured. A typical window function shape may be weighted with Blackman-Harris window function as shown in FIG. 3, or any other window function with similar characteristics.

The transform-domain processing sub-unit 212 processes the weighted data of the I/Q digital signal with a transform-domain operator, to obtain a detection result.

For example, the weighted data of the I/Q digital signal may be processed with a DFT operation to obtain a DFT-domain coefficient X(l,k) and the modulus of the signal may be calculated with the DFT-domain coefficient X(l,k), as shown in formulas 2 and 3:

$$X(l, k) = \quad \text{Formula 2}$$
$$DFT[x(l, n)] = \sum_{n=0}^{N-1} x(l, n) \cdot e^{-j2\pi kn/N} = X_i(l, k) + jX_q(l, k),$$
$$k = 0, 1, 2, \ldots, N-1$$
$$XM(l, k) = |X(l, k)| = |DFT[x(l, n)]| = sqrt(X_i(l, k) + X_q(l, k)) \quad \text{Formula 3}$$

In the formulas, the DFT-domain coefficient X(l,k) may be obtained through a base-2 complex Fast Fourier Transform (FFT) operation and may be implemented through $\log_2 N$ iterations from a butterfly shape. The logical resource of the butterfly implementation may be reused excellently, thereby enabling high resource utilization ratio and implementation efficiency. Of course, the DFT coefficient X(l,k) may also be obtained through other operations, such as a base-4 complex FFT operation.

The filtering sub-unit 213 is configured to perform smooth filtering on XM(l,k) to obtain a stable signal detection result.

During the smooth filtering, different α filters are used to filter in several stages, so as to attain the smoothing effect. For filtering of the interference detection result, using α filters is a typical and simple approach. Of course, the smoothing effect may also be obtained with other low-pass filters. The filtering relationship is shown in Formula 4:

$$XM(l,k)=(1-\alpha)*XM(l,k)+\alpha*XM(l-1,k) \quad \text{Formula 4}$$

In Formula 4, the higher the α value is, the stabler the filtered signals will be, but the miss alarm time when the interference just appears and the false alarm time after the interference disappears will be longer due to detection delay. In addition, the higher the energy of interference is and the shorter the detection time is, the longer the false alarm time will be. Missed alarms for interference are different and the costs of different missed alarms are different. Usually, the cost of missed alarms for strong interference is much higher than the cost of false alarms. Thus, the effect of false alarms and the effect of missed alarms to the system need to be traded off when determining the α value. Typically, the α value may be 0.875.

For intermittent interference pulses or other characteristic rapid-varying interference, to reduce the effect of false alarms and missed alarms, a filter with a lower α value may also be incorporated to implement parallel filtering. In other words, the output from the filter with lower α value is used to preferably judge whether the interference is a strong interference. If α=0, it indicates the detection result of the last data block is directly used for judgment.

After being processed by the above sub-units, the narrowband interference in different bandwidths at different energy levels may exhibit stable and detectable characteristics in DFT domain.

The interference suppression unit 290 includes an interference filter function synthesizing sub-unit 206, a data segmenting sub-unit 201, a suppression transform-domain processing sub-unit 202, an interference suppression sub-unit 203, a transform-domain inverse processing sub-unit 204 and a data consolidation sub-unit 205.

The interference filter function synthesizing sub-unit 206 synthesizes an interference suppression pulse function NSP(l,k) in real time on the basis of a unit noise pulse function $NP_U(k)$ according to the information of the reference-corrupted DFT spectrum line and energy, as shown in Formula 5:

$$NSP(l, k) = 1 - \sum_{m=1}^{M} a_m NP_U(k - m) \quad \text{Formula 5}$$

In formula 5, $\alpha_m$ is generally an equal-weight coefficient. As the quantity, energy and bandwidth of the interference vary, the position and magnitude of the DFT spectrum line of interference provided in the interference detection part vary accordingly; therefore, the interference suppression pulse function created in real time may match the energy and bandwidth of the narrowband interference adaptively.

Figure 4:
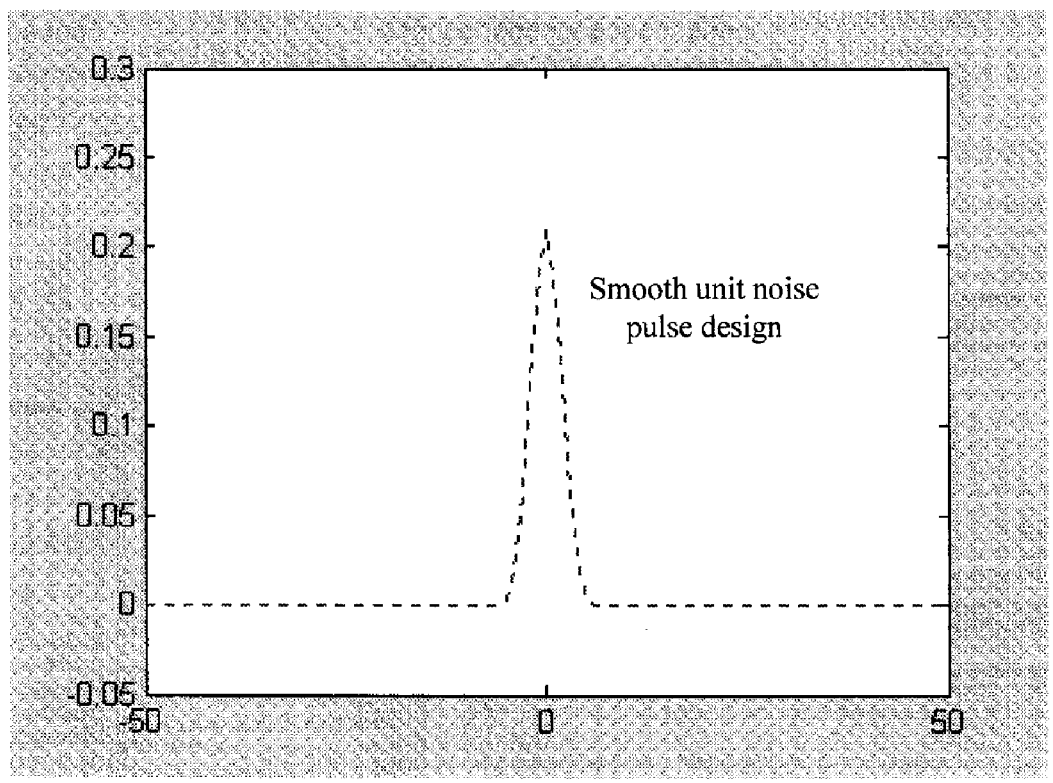
FIG. 4 is a graph illustrating a unit noise pulse function used in synthesizing an interference suppression pulse function.

When the interference suppression pulse function is optimized to match the characteristics of the interference in the transform domain, the best interference suppression effect in the transform domain may be attained. At this point, the unit noise pulse function is chosen according to the characteristics of unit noise pulses. For example, smooth pulses with a certain width are used instead of steep-edge impulses or step pulses, as shown in FIG. 4. The design of a smooth noise pulse function may further improve the interference suppression effect. Parameter information such as unit noise pulse function may be loaded at the interface and with a default common configuration. The parameter information may also be loaded at an optimized level according to the prior information of specific interference characteristics.

The data segmenting sub-unit 201 segments the data of in-phase/quadrate (I/Q) digital signals sampled by the receiver, each segment of data including N sample points and then performs overlap-save on the segmented data of the digital signals.

The overlap-save refers to that the adjacent data blocks overlap on each other to a certain degree when they are segmented. The data segmentation and the proportion of overlap-save depend on factors such as the transform-domain operation efficiency, the capacity of implementation devices and the filtering design. Usually, N is an integer power of 2, such as 128, 256, 1024, or 2048, and the overlap percentage may be about 50%.

Of course, in the present invention, not only overlap-save but also overlap-add may be used for the data segments, so as to further improve the filtering performance after the data segmentation.

The suppression transform-domain processing sub-unit 202 processes the data of the digital signals from the data segmenting sub-unit 201 with a transform-domain operator, to obtain the transform-domain signals processed with the transform-domain operator. The suppression transform-domain processing sub-unit 202 may process the segmented digital signals in the same way as the detection transform-domain processing sub-unit 212 or in a different way from the detection transform-domain processing sub-unit 212. For example, Discrete Cosine Transform (DCT) may be used.

The interference suppression sub-unit 203 retrieves the transform-domain signals processed with the transform-domain operator from the suppression transform-domain processing sub-unit 202 and then performs "AND" operation on the interference suppression pulse function synthesized by the interference filter function synthesizing sub-unit 206 and the transform-domain signals processed with the transform-domain operator for interference suppression, as shown in FIG. 6, to carry out interference suppression in the transform domain.

$$X(l,k)=X(l,k)*NSP(l,k) \quad \text{Formula 6}$$

The transform-domain inverse processing sub-unit 204 carries out a complex Inverse Discrete Fourier Transform (IDFT) on the I/Q data, as shown in FIG. 7, to restore the time-domain signals.

$$x(l, n) = \quad \text{Formula 7}$$
$$IDFT[X(l, k)] = \frac{1}{N}\sum_{k=0}^{N-1} X(l, k) \cdot e^{j2\pi kn/N} = x_i(l, k) + jx_q(l, k)$$

Here, the butterfly structure for the IDFT is similar to the butterfly structure for the DFT and may be obtained by sorting the data in reverse order and multiplying the sorted data by a constant 1/N on the basis of a base-2 complex FFT operation.

The data consolidation sub-unit 205 carries out a processing corresponding to the overlap-save operation performed by the data segmenting sub-unit 201.

The consolidated digital signals are used for baseband demodulation. Therefore, the effect of narrowband interference may be reduced greatly and the robustness of the communication system may be enhanced.

Furthermore, in order to recognize interference and abstract the characteristics such as DFT spectrum line corrupted by the interference and the intensity and bandwidth of the interference in real time, the interference detection unit in the device for suppressing narrowband interference provided in the present invention may further include an interference recognizing and characteristic extracting sub-unit 214.

The interference recognizing and characteristic extracting sub-unit 214 compares the filtered XM(l,k) with a threshold function XT(k), to recognize the DFT spectrum line corrupted by the interference and the bandwidth and intensity of the interference. Some parameters of the threshold function may be the relative threshold values of the background noise of the spectrum line without interference signals or may be configured directly.

The spectrum line XM(l,k) exceeding the threshold function is processed, the position of the interference spectrum line and the energy of the corrupt interference spectrum line are measured in real time and reported to the CPU of the receiver.

The present invention provides optional system enhancement functions to base station receivers. The present invention may be configured in two modes by parameter setting: 1) monitor mode: the real-time narrowband interference detection function is available, while the adaptive filtering is bypassed; 2) adaptive suppression mode: adaptive narrowband interference filtering is performed in real time and the interference detection result is reported.

In such a case, the interference detection unit must be separated from the interference suppression unit, which will not be described in detail herein.

The above device for suppressing narrowband interference may be integrated in a Field Programmable Gate Array (FPGA), Application-Specific Integrated Circuit (ASIC), high performance digital signal processor (DSP) or any other processing device.

Figure 5:
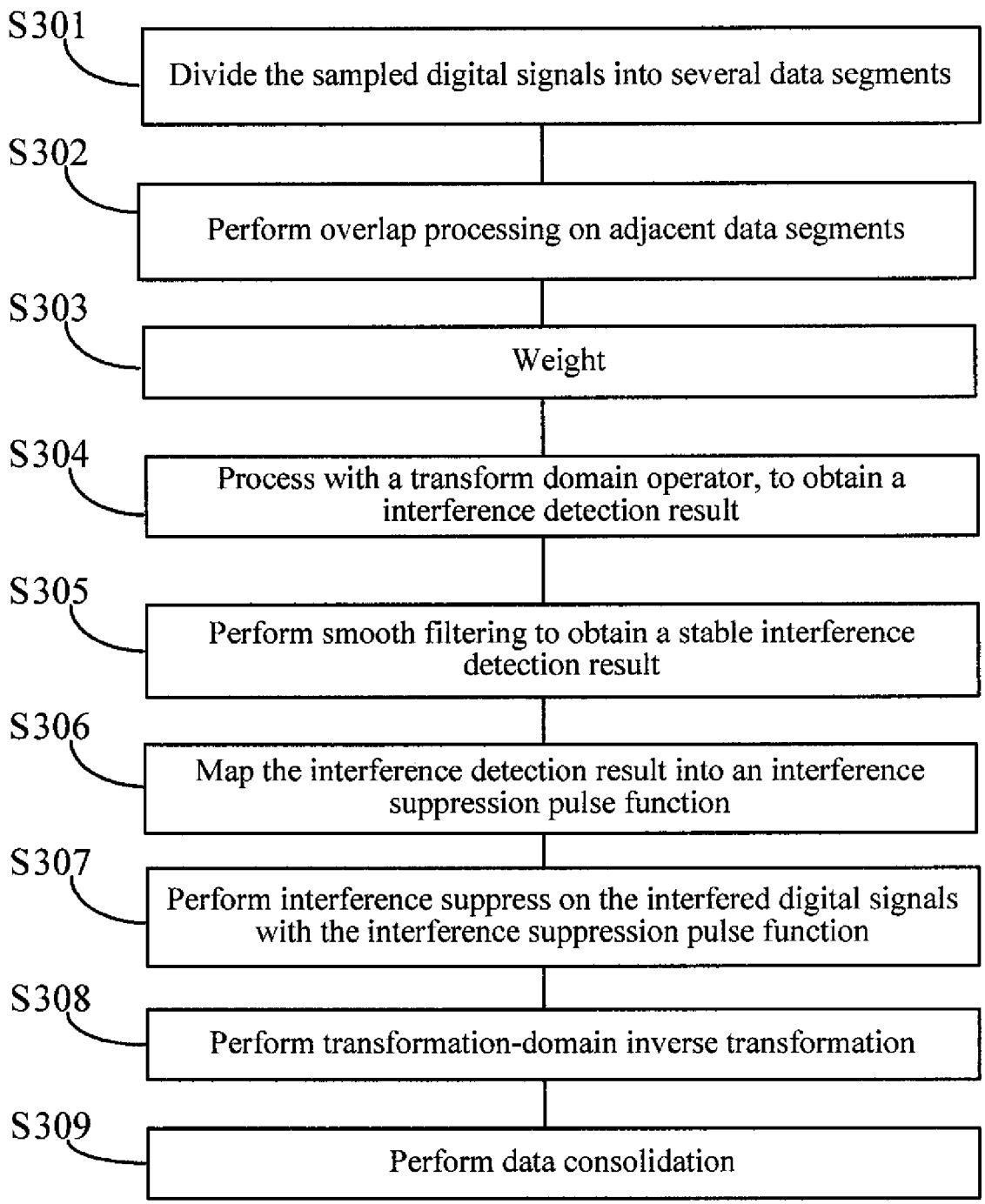
FIG. 5 is a flow chart illustrating a method provided in the present invention.

The present invention also provides a method for suppressing narrowband interference. The method obtains a result of interference detection according to sampled digital signals and then carries out interference suppression in the transform domain according to the result of interference detection. According to an embodiment as shown in FIG. 5, the implementation procedure includes the following.

In Block S301, the sampled digital signals are divided into several data segments.

In Block S302, overlap-save or overlap-add is performed on adjacent data segments.

In Block S303, the sampled digital signals are weighted. A window function or any other weighting method may be used in the weighting.

In Block S304, the weighted digital signals are processed with a transform-domain operator and an interference detection result is obtained, including information of an interference-corrupted spectrum line and energy.

In Block S305, a smooth filtering is performed on the interference detection result processed with the transform-domain operator, to obtain a stable interference detection result.

In Block S306, the interference detection result is mapped into an interference suppression pulse function.

In this process, the interference detection result may be synthesized into the interference suppression pulse function in real time on the basis of the unit noise pulse function for smoothing. Of course, the interference detection result may be mapped into the interference suppression pulse function on the basis of other similar pulse functions.

As the quantity, energy and bandwidth of the narrowband interference vary, the position and magnitude of the DFT spectrum line of the interference provided in the interference detection part vary accordingly. The interference suppression pulse function synthesized in real time on the basis of the unit noise pulse may be matched with the energy and bandwidth of the narrowband interference adaptively.

In Block S307, the interfered digital signals processed with the transform-domain operator are suppressed with the interference suppression pulse function.

During this process, an "AND" operation may be performed on the interference suppression pulse function and the interfered digital signals processed with the transform-domain operator, to calculate and obtain the interference-suppressed digital signals. Of course, the present invention is not limited to the processing approach with the "AND" operation and other approaches may be taken as required.

In Block S308, an inverse transformation operation in the transform domain is performed on the interference-suppressed digital signals, to obtain time-domain signals.

In Block S309, data consolidation is performed on the time-domain signals to obtain a consolidated interference suppression result.

In order to recognize the interference and abstract the characteristics such as the spectrum line corrupted by the interference and the intensity and bandwidth of the interference in real time, in another embodiment of the method provided in the present invention, the method further includes an interference recognition and characteristic extraction procedure between S305 and S306. The procedure includes the following processes.

In Process 1, the filtered interference detection result is compared with the threshold function; if the filtered interference detection result exceeds the spectrum line parameters of the threshold function, the position and energy characteristics of the interference detection result are measured;

In Process 2, the characteristics are reported to the CPU of the receiver.

The present invention supports two modes for implementation, that is, monitor mode, in which the real-time narrowband interference detection function is available, while the adaptive filtering is bypassed and adaptive suppression mode, in which adaptive narrowband interference filtering is performed in real time and the interference detection result is reported.

In conclusion, it can be seen that by introducing the present invention into a receiver, the influence of narrowband interference to system performance may be reduced greatly by means of adaptive detection and interference suppression along with the advantage of a wideband spread spectrum system in view of narrowband signals and the communication system may work normally in an environment almost without narrowband interference. As a result, the robustness of the receiving system may be enhanced.

Because the present invention is implemented in the digital part in front of the baseband demodulation, a base-2 FFT method may be used for the domain transformation operator DFT, so as to improve resource utilization efficiency.

The present invention employs digital signal processing and may be integrated in an ASIC, FPGA, or DSP. The present invention may be implemented with low cost and may be widely used in spread spectrum communication systems (e.g., CDMA, WCDMA, TD-SCDMA) and other wideband communication systems.

The present invention not only supports common default configuration for narrowband interference suppression, but also supports external loading of key parameters in the device. If the characteristics of specific narrowband interference are known, the parameters may be optimized and tuned with the prior knowledge as required and then configured into the device provided by the present invention by a programming interface of the device, so as to enhance the interference suppression capability.

Though the present invention is described above in the preferred embodiments, it is noted that the protect scope of the present invention is not limited to these preferred embodiments. Those skilled in the art may make modifications and variations in light of this disclosure, without departing from the basic principle of the present invention and any of those modifications and variations shall fall into the protected scope of the present invention defined by the accompanied claims.

The invention claimed is:

1. A method for suppressing narrowband interference, comprising:
    obtaining an interference detection result with sampled digital signals;
    carrying out interference suppression in a transform domain according to the interference detection result, wherein carrying out interference suppression in a transform domain according to the interference detection result comprises:
    mapping the interference detection result into an interference suppression pulse function, wherein mapping the interference detection result into an interference suppression pulse function comprises: synthesizing the interference suppression pulse function in real time according to the interference detection result on the basis of a unit noise pulse function;
    processing the digital signals with the transform-domain operator; and
    performing interference suppression on the interfered digital signals processed with the transform-domain operator by using an interference suppression pulse function.

2. The method according to claim 1, wherein the obtaining an interference detection result with sampled digital signals comprises:
    weighting the sampled digital signals;
    processing the weighted digital signals in the transform domain with a transform-domain operator, to obtain the interference detection result.

3. The method according to claim 1, wherein the performing interference suppression on the interfered digital signals processed with the transform-domain operator comprises:
    performing an "AND" operation on the interference suppression pulse function and the interfered digital signals processed with the transform-domain operator, to calculate and obtain the interference-suppressed digital signals.

4. The method according to claim 1, wherein the method further comprises:
    performing a transform-domain inverse transformation on the interference-suppressed digital signals to obtain time-domain signals.

5. The method according to claim 4, wherein the method further comprises:
    performing smooth filtering on the interference detection result processed with the transform-domain operator, to obtain a stable interference detection result.

6. The method according to claim 5, wherein the method further comprises:
dividing the sampled digital signals into several data segments;
performing overlap-save or overlap-add on adjacent data segments;
performing data consolidation on the time-domain signals to obtain a consolidated interference suppression result.

7. The method according to claim 6, wherein the method further comprises:
comparing the filtered interference detection result with a threshold function, and if the filtered interference detection result exceeds spectrum line parameters of the threshold function, measuring a position characteristic and an energy characteristic of the interference detection result;
reporting the characteristics to a central processing unit of a receiver.

8. The method according to claim 7, wherein the mapping the interference detection result into an interference suppression pulse function further comprises:
choosing the unit noise pulse function according to characteristics of pulses;
synthesizing the interference suppression pulse function in real time with the interference detection result on the basis of the unit noise pulse function.

9. A device for suppressing narrowband interference, comprising:
an interference detection unit, configured to obtain an interference detection result according to sampled digital signals;
an interference suppression unit, configured to carry out interference suppression in a transform domain according to the interference detection result, wherein
the interference suppression unit comprises:
an interference filter function synthesizing sub-unit, configured to synthesize an interference suppression pulse function in real time on the basis of a unit noise pulse function;
a suppression transform-domain processing sub-unit, configured to process the digital signals with the transform-domain operator to obtain the interfered digital signals processed with the transform-domain operator;
a suppression sub-unit, configured to perform a processing according to the interference suppression pulse function and the interfered digital signals processed with the transform-domain operator, to calculate and obtain the interference-suppressed digital signals.

10. The device according to claim 9, wherein
the interference detection unit comprises:
a preprocessing sub-unit, configured to weight the sampled digital signals;
a detection transform-domain processing sub-unit, configured to process the weighted digital signals with a transform-domain operator to obtain the interference detection result.

11. The device according to claim 10, wherein the interference detection unit further comprises:
a data segmenting sub-unit, configured to segment the sampled digital signals and perform overlap-save or overlap-add on the digital signals on adjacent data segments;
and the interference suppression unit further comprises:
an transform-domain inverse transform processing sub-unit, configured to perform a transform-domain inverse transformation on the interference-suppressed digital signals, to obtain time-domain signals;
a data consolidation sub-unit, configured to perform data consolidation on the time-domain signals, to obtain a consolidated interference suppression result.

12. The device according to claim 9, wherein the interference suppression unit further comprises a filtering sub-unit, configured to perform smooth filtering on the interference detection result processed with the transform-domain operator, to obtain a stable interference detection result.

13. The device according to claim 12, wherein the interference detection unit further comprises: an interference recognizing and characteristic extracting sub-unit, configured to compare the filtered interference detection result with a threshold function and to measure a position characteristic and an energy characteristic of the interference detection result and report the characteristics to a central processing unit of a receiver if the filtered interference detection result exceeds spectrum line parameters of the threshold function.

14. The device according to claim 9, wherein the device is arranged in a digital signal processing part before baseband demodulation of a wideband receiver.

15. The method according to claim 1, wherein the method further comprises: performing a transform-domain inverse transformation on the interference-suppressed digital signals to obtain time-domain signals.

16. The method according to claim 3, wherein the method further comprises:
performing a transform-domain inverse transformation on the interference-suppressed digital signals to obtain time-domain signals.

17. The device according to claim 10, wherein the interference suppression unit further comprises a filtering sub-unit, configured to perform smooth filtering on the interference detection result processed with the transform-domain operator, to obtain a stable interference detection result.

18. The device according to claim 11, wherein the interference suppression unit further comprises a filtering sub-unit, configured to perform smooth filtering on the interference detection result processed with the transform-domain operator, to obtain a stable interference detection result.

* * * * *